United States Patent
Kajimoto

(10) Patent No.: US 10,127,193 B2
(45) Date of Patent: Nov. 13, 2018

(54) TEXT DISPLAY CONTROL APPARATUS AND METHOD FOR CONTROLLING TEXT TO BE DISPLAYED

(71) Applicant: ALPINE ELECTRONICS, INC., Shinagawa-ku, Tokyo (JP)

(72) Inventor: Tomomi Kajimoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 262 days.

(21) Appl. No.: 15/155,262

(22) Filed: May 16, 2016

(65) Prior Publication Data
US 2016/0357710 A1   Dec. 8, 2016

(30) Foreign Application Priority Data
Jun. 5, 2015 (JP) ................. 2015-114941

(51) Int. Cl.
*G06F 17/21* (2006.01)
*G06F 17/24* (2006.01)
*G06F 17/25* (2006.01)

(52) U.S. Cl.
CPC ......... *G06F 17/211* (2013.01); *G06F 17/214* (2013.01); *G06F 17/24* (2013.01); *G06F 17/25* (2013.01)

(58) Field of Classification Search
CPC ...................................................... G06F 17/21
See application file for complete search history.

(56) References Cited

U.S. PATENT DOCUMENTS 4,897,804 A * 1/1990 Kawakami ............. G06F 17/21
                                          345/157
2014/0136969 A1* 5/2014 Horiuchi et al. ....... G06F 17/24

FOREIGN PATENT DOCUMENTS

JP   2008-225049   9/2008

* cited by examiner

*Primary Examiner* — James J Debrow
(74) *Attorney, Agent, or Firm* — Brinks Gilson & Lione

(57) ABSTRACT

A text display control apparatus includes a text determination unit that determines whether an input text can be displayed within the width of a text display area, a space selection unit that, if the text cannot be displayed within the width of the text display area, sequentially selects spaces from an end of the text to a beginning, a partial text determination unit that determines whether a part of the text before a selected space can be displayed within the width of the text display area, and a newline insertion unit that, if the part of the text before the space can be displayed within the width of the text display area, inserts a newline character into the text at the space. If the input text cannot be displayed within the width of the text display area, a new line automatically starts in the text at the space.

14 Claims, 10 Drawing Sheets

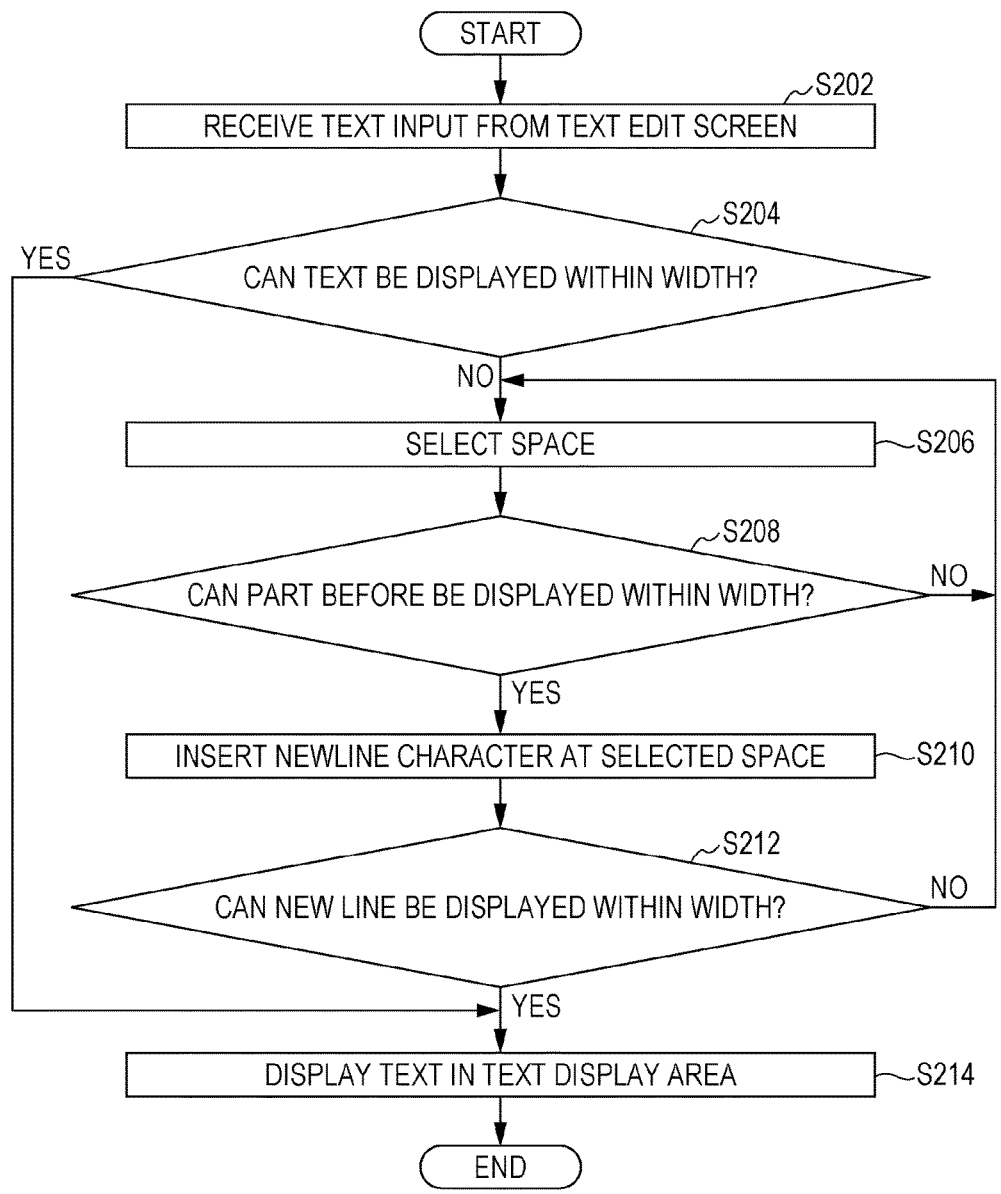

TEXT DISPLAY CONTROL APPARATUS AND METHOD FOR CONTROLLING TEXT TO BE DISPLAYED

RELATED APPLICATION

The present application claims priority to Japanese Patent Application Number 2015-114941, filed Jun. 5, 2015, the entirety of which is hereby incorporated by reference.

BACKGROUND

1. Field of the Invention

The present invention relates to a text display control apparatus and a method for controlling text to be displayed and, more particularly, to a text display control apparatus and a method for controlling text to be displayed that are capable of displaying a text input from a text edit screen in a text display area in a display screen.

2. Description of the Related Art

Currently, a technique for inputting text to be displayed in a text display area in a display screen from a text edit screen, which is a screen different from the display screen, is used in various information processing apparatuses. In the case of an onboard apparatus, for example, a user can customize a name displayed in a text display area of each of a plurality of buttons displayed in a display screen by inputting text from a text edit screen. In some devices, if an input text cannot be displayed in a text display area within a line, a new line starts in the text in the text display area.

In Japanese Unexamined Patent Application Publication No. 2008-225049, a technique is disclosed in which, when text is displayed in a text display area, a newline code is inserted into the text at an appropriate position, and if it is determined that a display mode of the text is out of balance, the position of the newline code is changed.

SUMMARY

In the technique disclosed in the example of the related art, however, it is difficult to understand where a new line will start in a text displayed in a text display area just by inputting the text from a text edit screen. If a new line starts halfway through a word, the text is hard to read. In this case, in order to start a new line in the text at an appropriate position (between words), a user undesirably needs to repeat a troublesome operation in which the user checks a position at which a new line starts by displaying a text in the text display area after inputting the text from the text edit screen and then adjusts the text after returning to the text edit screen.

FIGS. 10A and 10B are diagrams illustrating an example of text displayed on an onboard apparatus in an example of the related art. A text edit screen 1000 illustrated in FIG. 10A includes a text input area 1002 and software keys 1004. The user can input an arbitrary text to the text input area 1002 by operating a touch panel and sequentially selecting software keys corresponding to the arbitrary text from the software keys 1004. FIG. 10A illustrates an example in which a text "Truck Tool Box Lock" is input to the text input area 1002.

In a button edit screen 1010 illustrated in FIG. 10B, eight buttons 1012A to 1012H are displayed. A text display area (an area indicated by broken line in FIG. 10B) is provided under each of the buttons 1012A to 1012H. The user can customize a name displayed in the text display area of each of the buttons 1012A to 1012H by inputting text from the text edit screen 1000 illustrated in FIG. 10A. FIG. 10B illustrates an example in which the text "Truck Tool Box Lock" input from the text edit screen 1000 is displayed in the text display area of the button 1012H.

Because the text "Truck Tool Box Lock" input from the text edit screen 1000 cannot be displayed in the text display area of the button 1012H within oneline, a new line starts in the text in the text display area at a position according to the width of the text display area. More specifically, the text "Truck Tool Box Lock" is displayed in the text display area of the button 1012H with a new line starting halfway through a word "Box" (between "B" and "o"). The text "Truck Tool Box Lock", therefore, is hard to read.

In order to avoid such a consequence, the user undesirably needs to repeat an operation for inserting a space for adjusting a position at which a new line starts in the text "Truck Tool Box Lock" in the text edit screen 1000 and an operation for checking how the text "Truck Tool Box Lock" adjusted in the button edit screen 1010 is displayed in the text display area of the button 1012H.

The present invention is established in order to solve this problem and aims to start a new line in a text input from a text edit screen at an appropriate position and display the text in a text display area in a display screen in an easy-to-see manner without requiring the user to perform a troublesome operation.

In order to solve the above problem, in the present disclosure, it is determined whether a text input from a text edit screen is short enough to be displayed within a width of a text display area. If it is determined that the text is not short enough to be displayed within the width of the text display area, spaces are sequentially selected from an end of the text to a beginning. Each time a space is selected, it is determined whether a part of the text before the selected space is short enough to be displayed within the width of the text display area. If it is determined that the part of the text before the selected space is short enough to be displayed within the width of the text display area, a newline character is inserted into the text at the selected space. The text determined to be short enough to be displayed within the width of the text display area or the text into which the newline character has been inserted is then displayed in the text display area.

According to the embodiment configured as above, if a text input by the user from the text edit screen cannot be displayed within the width of the text display area, a new line automatically starts at a space (that is, between words) such that the text is displayed within the width of the text display area, and the text is displayed in the text display area. According to the present disclosure, therefore, a new line can start in a text input from the text edit screen at an appropriate position and the text can be displayed in the text display area in the display screen in an easy-to-see manner without requiring the user to perform a troublesome operation.

BRIEF DESCRIPTION OF THE DRAWINGS

FIG. 2 is a flowchart illustrating an example of a process performed by the onboard apparatus according to the first embodiment of the present invention;

DETAILED DESCRIPTION OF THE PREFERRED EMBODIMENTS

First Embodiment

Figure 1:
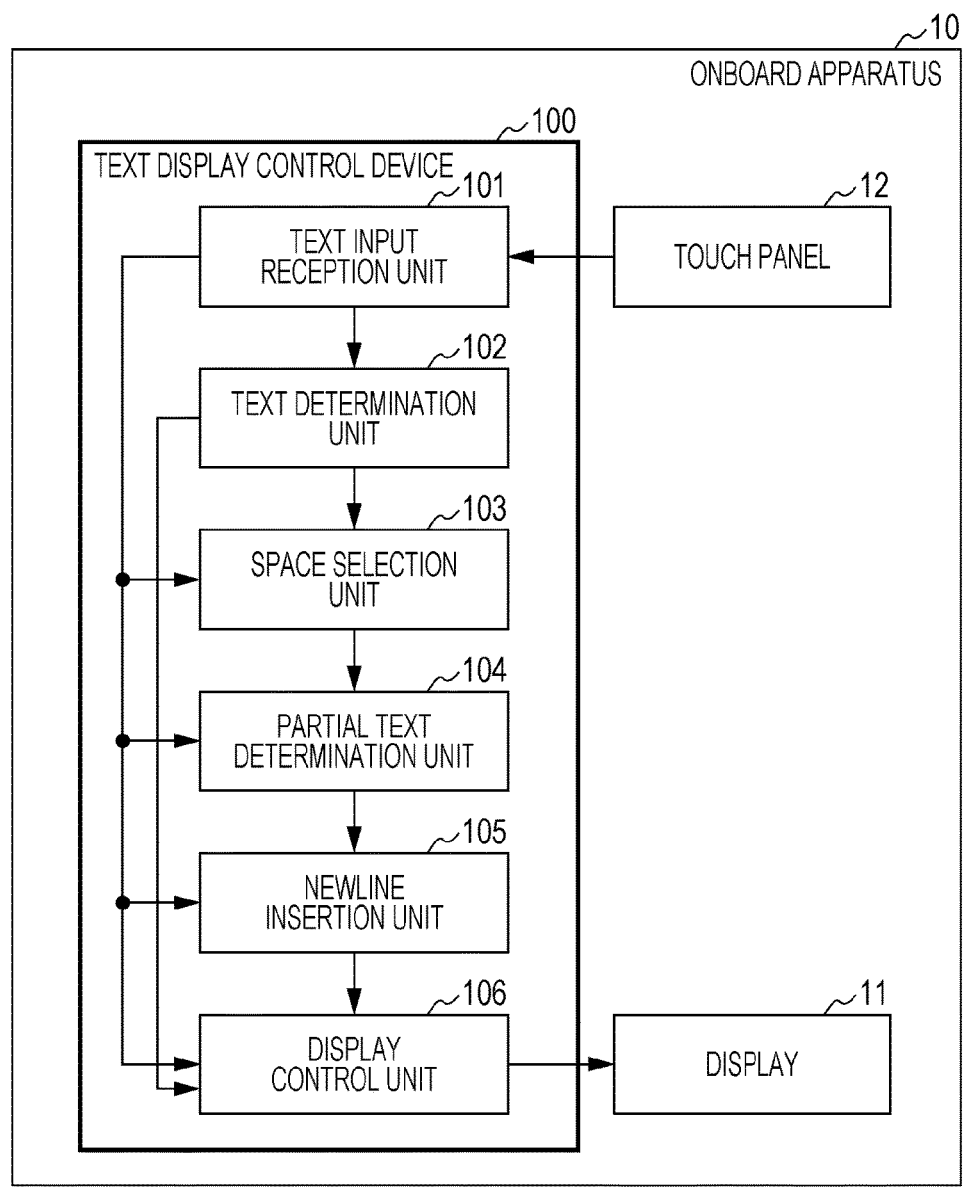
FIG. 1 is a block diagram illustrating an example of a functional configuration of an onboard apparatus according to a first embodiment of the present invention.

An embodiment of the present invention will be described hereinafter. FIG. 1 is a block diagram illustrating an example of a functional configuration of an onboard apparatus 10 according to a first embodiment of the present invention. The onboard apparatus 10 illustrated in FIG. 1 is an apparatus installed in a vehicle such as an automobile. The onboard apparatus 10 has, for example, a navigation function, an audio function, or the like. The present invention is not limited to an onboard apparatus, but may be applied to any information processing apparatus (e.g., a mobile information terminal) insofar as a text display area in which text can be edited can be displayed on a display screen. The present invention is effective especially in a configuration in which a display screen including a text display area and a text edit screen for editing text in the text display area are alternately displayed (that is, a configuration with which it is difficult to understand how text will be displayed in a text display area from a text edit screen).

Example of Functional Configuration of Onboard Apparatus 10

As illustrated in FIG. 1, the onboard apparatus 10 includes a display 11, a touch panel 12, and a text display control device 100. The text display control device 100 includes a text input reception unit 101, a text determination unit 102, a space selection unit 103, a partial text determination unit 104, a newline insertion unit 105, and a display control unit 106 as functional blocks thereof.

The function blocks 101 to 106 may be hardware, digital signal processors (DSPs), or software. If, in practice, the function blocks 101 to 106 are software, for example, the function blocks 101 to 106 include a central processing unit (CPU), a random-access memory (RAM), a read-only memory (ROM), and the like of a computer and are achieved when programs stored in a storage medium such as the RAM, the ROM, a hard disk, or a semiconductor memory run.

Figure 3A:
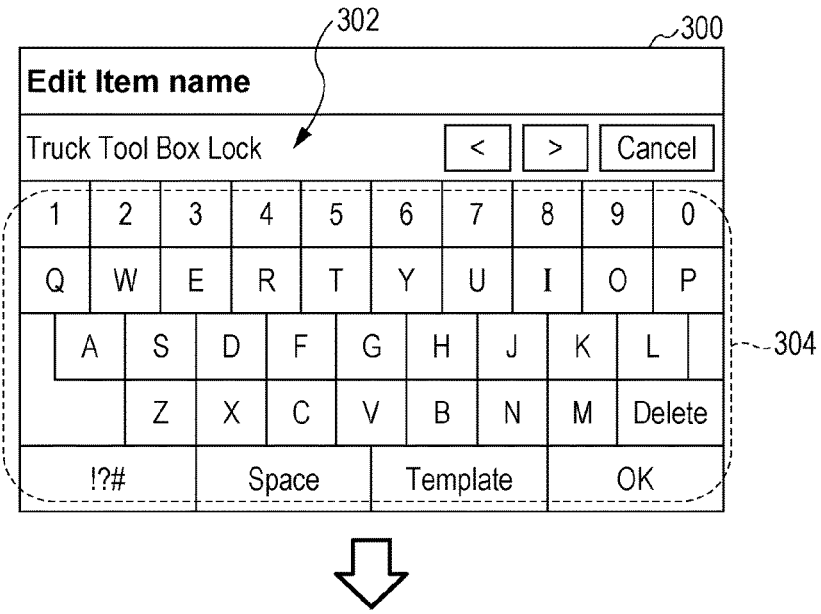
FIGS. 3A to 3C are diagrams illustrating a specific example of a process for controlling text to be displayed performed by the onboard apparatus according to the first embodiment of the present invention.
Figure 3B:
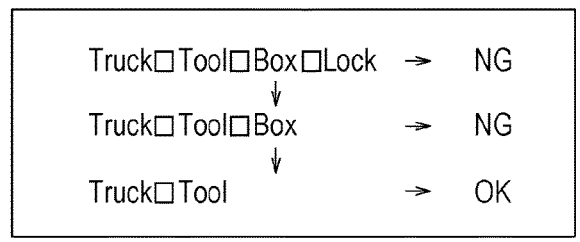
Figure 3C:
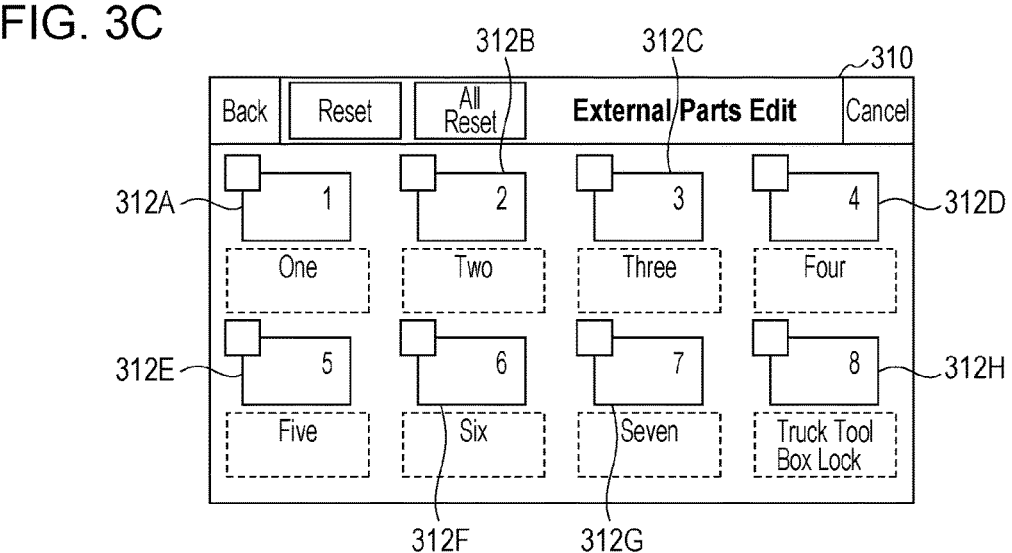

The display 11 displays various pieces of information (e.g., a text edit screen 300 and a button edit screen 310 illustrated in FIGS. 3A to 3C). As the display 11, for example, a liquid crystal display or an organic electroluminescent (EL) display is displayed. The touch panel 12 is an example of an operation unit for performing various operations (e.g., an operation for inputting text from the text edit screen 300).

The text input reception unit 101 receives text from the text edit screen 300 through an operation performed by a user on the touch panel 12.

The text determination unit 102 determines whether text input from the text edit screen 300 can be displayed within the width of a corresponding text display area in the button edit screen 310 (an example of a "display screen" described in the claims). More specifically, the text determination unit 102 determines whether a text input from the text edit screen 300 can be displayed within the width of a corresponding text display area on the basis of whether the number of letters (a space is counted as a letter) included in the text is larger than the maximum number of letters that can be displayed within the width of the text display area. The button edit screen 310 is a screen for editing positions and names of buttons in a certain operation screen (not illustrated). If editing performed in the button edit screen 310 is confirmed, the certain operation screen reflects the editing. That is, text displayed in a text display area in the button edit screen 310 is displayed in a text display area in the certain operation screen. The certain operation screen, therefore, can be considered as an example of the "display screen" described in the claims.

If the text determination unit 102 determines that text input from the text edit screen 300 cannot be displayed within the width of a text display area, the space selection unit 103 sequentially selects spaces from an end of the text to a beginning. That is, if a text input from the text edit screen 300 is "Truck Tool Box Lock", for example, a space between "Box" and "Lock" is selected first, and then a space between "Tool" and "Box" is selected.

Each time the space selection unit 103 selects a space in a text input from the text edit screen 300, the partial text determination unit 104 determines whether a part of the text before the space can be displayed within the width of a text display area. More specifically, the partial text determination unit 104 determines whether a part of the text, which has been input from the text edit screen 300, before a space can be displayed within the width of a text display area on the basis of whether the number of letters (a space is counted as a letter) included in the part of the text before the space is larger than the maximum number of letters that can be displayed within the width of the text display area.

If the space selection unit 103 selects the space between "Box" and "Lock" in the text "Truck Tool Box Lock", for example, the partial text determination unit 104 determines whether "Truck Tool Box" can be displayed within the width of a text display area. If the space selection unit 103 then selects the space between "Tool" and "Box", the partial text determination unit 104 determines whether "Truck Tool" can be displayed within the width of the text display area.

If the partial text determination unit 104 determines that a part of the text, which has been input from the text edit screen 300, before a space can be displayed within the width of a text display area, the newline insertion unit 105 inserts a newline character into the text input from the text edit screen 300 at the space. If the space selection unit 103 selects the space between "Box" and "Lock" in the text "Truck Tool Box Lock", for example, the partial text determination unit 104 determines whether "Truck Tool Box" can be displayed within the width of a text display area. If the partial text determination unit 104 determines that "Truck Tool Box" can be displayed within the width of the text display area, the newline insertion unit 105 inserts a newline character into the text "Truck Tool Box Lock" at the space between "Box" and "Lock" (replaces the space with a newline character).

The display control unit 106 displays the text edit screen 300 and the button edit screen 310 on the display 11. The display control unit 106 can alternately display the text edit screen 300 and the button edit screen 310 on the display 11. The display control unit 106 switches a screen displayed on the display 11 from the button edit screen 310 to the text edit screen 300, for example, when text is input to a text display area in the button edit screen 310. The display control unit 106 switches the screen displayed on the display 11 from the text edit screen 300 to the button edit screen 310, for example, when an input text is confirmed in the text edit screen 300. At this time, the display control unit 106 displays the text input from the text edit screen 300 in a text display area in the button edit screen 310.

If the text determination unit 102 determines that a text input from the text edit screen 300 can be displayed within the width of a text display area, the display control unit 106 displays the text in the text display area without starting a new line.

On the other hand, if the text determination unit 102 determines that a text input from the text edit screen 300 cannot be displayed within the width of a text display area, the display control unit 106 displays, in the text display area, a text into which a newline character has been inserted by the newline insertion unit 105.

Example of Process Performed by Onboard Apparatus 10

FIG. 2 is a flowchart illustrating an example of a process performed by the onboard apparatus 10 according to the first embodiment of the present invention. The process illustrated in FIG. 2 is performed by the onboard apparatus 10, for example, when the user edits text for a text display area of an arbitrary button displayed in the button edit screen 310 (refer to FIG. 3C). If the user selects a text display area of an arbitrary button in the button edit screen 310, a screen displayed on the display 11 switches from the button edit screen 310 to the text edit screen 300.

First, the text input reception unit 101 receives a text input from the text edit screen 300 (step S202). Next, the text determination unit 102 determines whether the text input in step S202 can be displayed within the width of a text display area (step S204). If the text determination unit 102 determines that the text input in step S202 can be displayed within the width of the text display area (YES in step S204), the display control unit 106 displays the text input in step S202 in the text display area without starting a new line (step S214), and the onboard apparatus 10 ends the process illustrated in FIG. 2.

On the other hand, if the text determination unit 102 determines that the text input in step S202 cannot be displayed within the width of the text display area (NO in step S204), the space selection unit 103 selects a first space from an end of the text input in step S202 (step S206). The partial text determination unit 104 then determines whether a part of the text, which has been input in step S202, before the space can be displayed within the width of the text display area (step S208).

If the partial text determination unit 104 determines that the part of the text, which has been input in step S202, before the space cannot be displayed within the width of the text display area (NO in step S208), the space selection unit 103 selects a next space in the text input in step S202 (step S206), and the partial text determination unit 104 makes the determination in step S208 again.

On the other hand, if the partial text determination unit 104 determines that the part of the text, which has been input in step S202, before the space can be displayed within the width of the text display area (YES in step S208), the newline insertion unit 105 inserts a newline character into the text input in step S202 at the space selected in step S206 (step S210).

The partial text determination unit 104 then determines whether a new line of the text input in step S202 can be displayed within the width of the text display area (step S212). If the partial text determination unit 104 determines that the new line of the text input in step S202 cannot be displayed within the width of the text display area (NO in step S212), the onboard apparatus 10 performs the processing in step S206 and later again.

On the other hand, if the partial text determination unit 104 determines that the new line of the text input in step S202 can be displayed within the width of the text display area (YES in step S212), the display control unit 106 displays the text into which a newline character has been inserted in step S210 in the text display area (step S214), and the onboard apparatus 10 ends the process illustrated in FIG. 2.

Specific Example of Process for Controlling Text to Be Displayed

FIGS. 3A to 3C are diagrams illustrating a specific example of a process for controlling text to be displayed performed by the onboard apparatus 10 according to the first embodiment of the present invention. The text edit screen 300 illustrated in FIG. 3A includes a text input area 302 and software keys 304. The user can input an arbitrary text to the text input area 302 by operating the touch panel 12 and sequentially selecting software keys corresponding to the arbitrary text from the software keys 304. FIG. 3A illustrates an example in which the text "Truck Tool Box Lock" has been input to the text input area 302. The user can confirm the text input to the text input area 302 as text to be displayed in a text display area by selecting an OK button.

In the button edit screen 310 illustrated in FIG. 3C, eight buttons 312A to 312H are displayed. Under the buttons 312A to 312H, text display areas (areas indicated by broken lines in FIG. 3C) are provided. If the user operates the touch panel 12 and selects the text display area of one of the buttons 312A to 312H, the display 11 displays the text edit screen 300 for inputting text to the selected text display area instead of the button edit screen 310. If the user inputs text in the text edit screen 300 and confirms the text, the display 11 displays the button edit screen 310 instead of the text edit screen 300. In the button edit screen 310, the text input from the text edit screen 300 is displayed in the text display area selected by the user. The user can thus customize a name displayed in the text display area of each of the buttons 312A to 312H in the button edit screen 310. FIG. 3C illustrates an example in which "Truck Tool Box Lock" input from the text edit screen 300 is displayed in the text display area of the button 312H.

FIG. 3B conceptually illustrates determinations made by the text determination unit 102 and the partial text determination unit 104 for the text "Truck Tool Box Lock" input from the text edit screen 300.

First, the text determination unit 102 determines whether the text "Truck Tool Box Lock" can be displayed within the width of the text display area of the button 312H. Here, the maximum number of letters that can be displayed within the width of the text display area of the button 312H is 12. On the other hand, the number of letters included in the text "Truck Tool Box Lock" is 19. The text determination unit 102 therefore determines that the text "Truck Tool Box Lock" cannot be displayed within the width of the text display area of the button 312H.

Next, the space selection unit 103 selects the space between "Box" and "Lock" in the text "Truck Tool Box Lock". The partial text determination unit 104 determines whether a partial text "Truck Tool Box" can be displayed within the width of the text display area of the button 312H. The number of letters included in the partial text "Truck Tool Box Lock" is 14. The partial text determination unit 104 therefore determines that the partial text "Truck Tool Box Lock" cannot be displayed within the width of the text display area of the button 312H.

Next, the space selection unit 103 selects the space between "Tool" and "Box" in the text "Truck Tool Box Lock". The partial text determination unit 104 determines whether a partial text "Truck Tool" can be displayed within the width of the text display area of the button 312H. The number of letters included in the partial text "Truck Tool" is 10. The partial text determination unit 104 therefore determines that the partial text "Truck Tool" can be displayed within the width of the text display area of the button 312H.

On the basis of these determinations, the newline insertion unit 105 inserts a newline character into the text "Truck Tool Box Lock" at the space between "Tool" and "Box" (replaces the space with a newline character). As a result, as illustrated in FIG. 3C, the text "Truck Tool Box Lock" is displayed in the text display area of the button 312H with a new line starting at the space between "Tool" and "Box". The text "Truck Tool Box Lock" can thus be displayed in the text display area of the button 312H in an easy-to-see manner.

Although "Truck Tool" in a first line and "Box Lock" in a second line are left-justified in the text display area of the button 312H in the example illustrated in FIG. 3C, these partial texts may be center-justified or right-justified, instead.

As described above, according to the first embodiment of the present invention, if a text input by the user from the text edit screen 300 cannot be displayed within a text display area, a new line automatically starts in the text at a space (that is, between words) such that the text is displayed within the width of the text display area, and the text is displayed in the text display area. According to the first embodiment of the present invention, therefore, a text input from the text edit screen 300 can be displayed in a text display area in the button edit screen 310 in an easy-to-see manner without necessitating the user to perform a troublesome operation.

In addition, according to the first embodiment of the present invention, spaces are sequentially selected from an end of a text, and a new line starts at one of the spaces. A word dictionary or the like for identifying spaces between words, therefore, need not be provided, and a new line can start at a space with a relatively simple configuration.

In addition, according to the first embodiment of the present invention, spaces are sequentially selected from an end of the text in order to determine a position of a newline character. Letters can therefore be displayed in each line of a text display area as many as possible. That is, since the number of lines can be reduced to a minimum, the text display area can be effectively used.

Second Embodiment

Next, a second embodiment of the present invention will be described with reference to FIGS. 4 to 6C. In the second embodiment, an example will be described in which each time the size of each text display area is changed, a position of a newline character in the text is changed in accordance with the size of each text display area.

Example of Functional Configuration of Onboard Apparatus 10'

Figure 4:
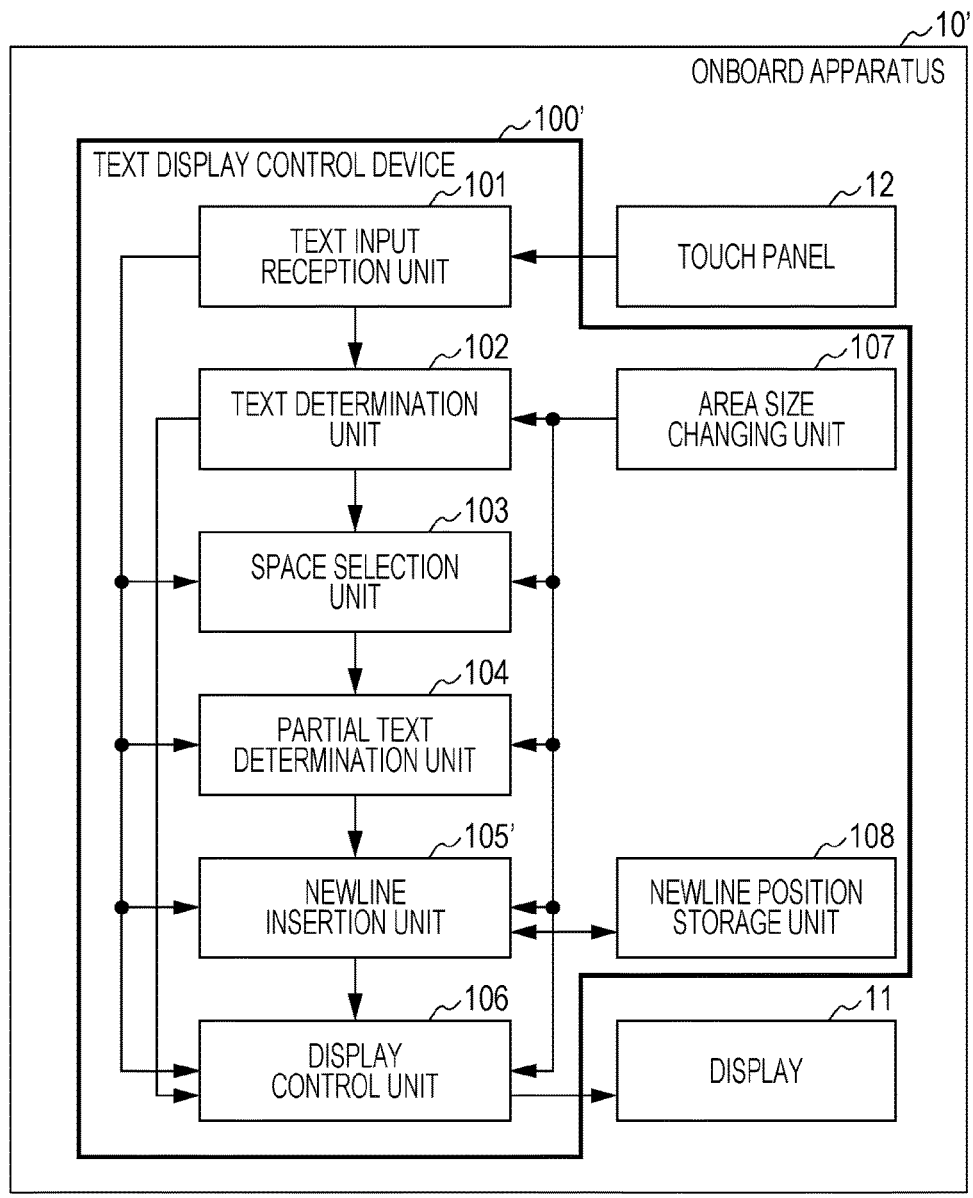
FIG. 4 is a block diagram illustrating an example of a functional configuration of an onboard apparatus according to a second embodiment of the present invention.

FIG. 4 is a block diagram illustrating an example of a functional configuration of an onboard apparatus 10' according to the second embodiment of the present invention. The onboard apparatus 10' illustrated in FIG. 4 is different from the onboard apparatus 10 according to the first embodiment illustrated in FIG. 1 in that a text display control device 100' further includes an area size changing unit 107 and a newline position storage unit 108 and replaces the newline insertion unit 105 with a newline insertion unit 105'.

The area size changing unit 107 changes the size of a text display area. If the number of buttons to be displayed in the button edit screen 310 increases, for example, the area size changing unit 107 reduces the size of a text display area of each button. On the other hand, if the number of buttons to be displayed in the button edit screen 310 decreases, the area size changing unit 107 increases the size of the text display area of each button. In the onboard apparatus 10', the size of each text display area is determined in advance depending on the number of buttons displayed in the button edit screen 310.

Each time the area size changing unit 107 changes the size of each text display area, the newline insertion unit 105' changes a position of a newline character in text displayed in each text display area.

Each time the area size changing unit 107 changes the size of each text display area, the newline position storage unit 108 associates a new size of each text display area and a new position of a newline character in text displayed in each area with each other and stores the size and the position.

If a position of a newline character corresponding to a new size of a text display area is stored in the newline position storage unit 108, the newline insertion unit 105' resets an already inserted newline character to a space in a text input to the text display area and newly inserts a newline character at the position of a newline character stored in the newline position storage unit 108. The display control unit 106 then displays the text into which the newline insertion unit 105' has newly inserted a newline character in the text display area.

On the other hand, if a position of a newline character corresponding to a new size of a text display area is not stored in the newline position storage unit 108, the newline insertion unit 105' resets an already inserted newline character to a space in a text input to the text display area and newly inserts a newline character at a position newly obtained by the space selection unit 103 and the partial text determination unit 104 (that is, a space with which a partial text can be displayed within the width of the text display area). The display control unit 106 then displays the text into which the newline insertion unit 105' has newly inserted a newline character in the text display area.

If text displayed in a text display area can be displayed within the width of the text display area having a new size without starting a new line, the newline insertion unit 105' resets an already inserted newline character to a space but does not newly insert a newline character.

Example of Process Performed by Onboard Apparatus 10'

Figure 5:
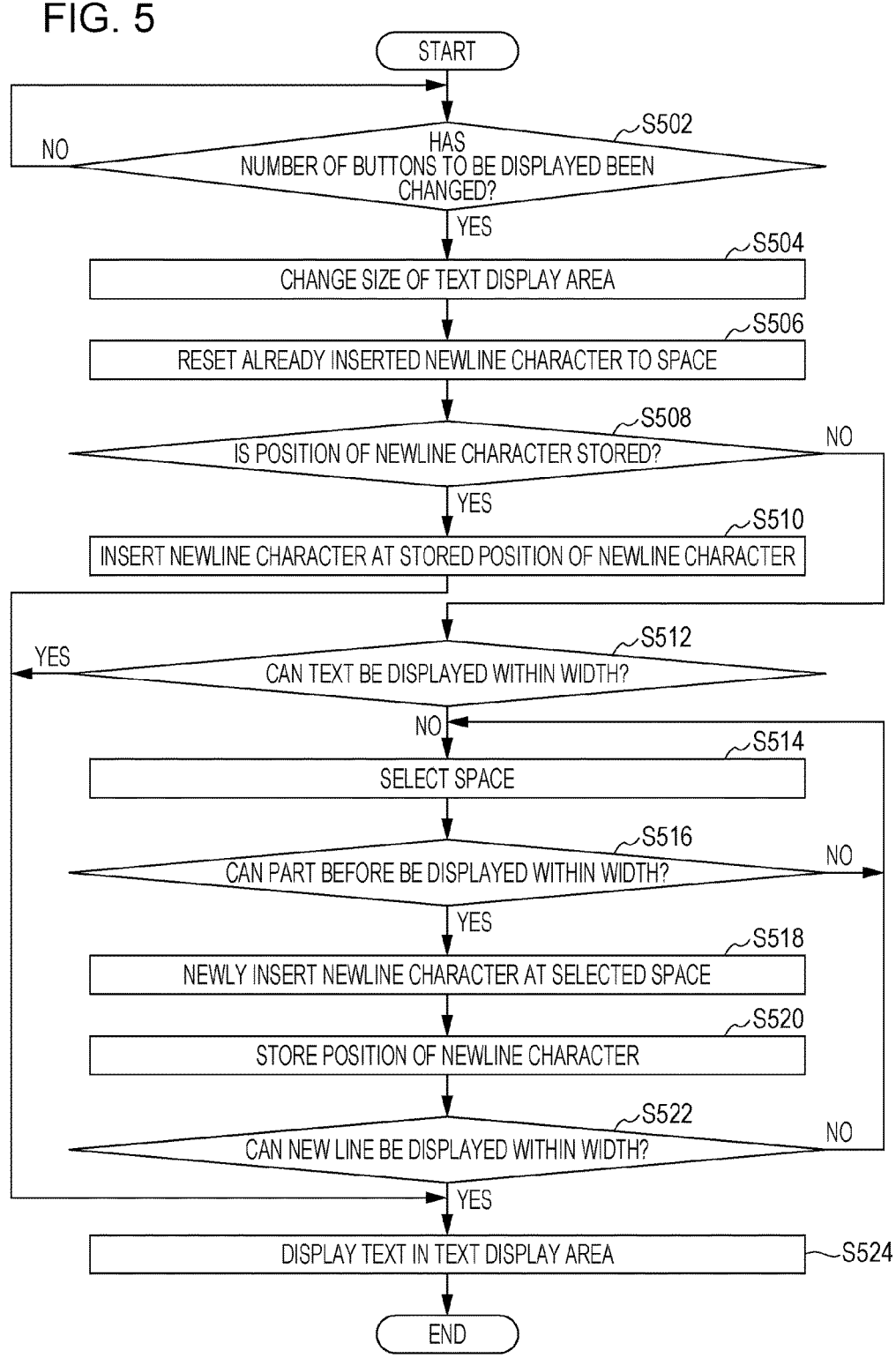
FIG. 5 is a flowchart illustrating an example of a process performed by the onboard apparatus according to the second embodiment of the present invention.

FIG. 5 is a flowchart illustrating an example of a process performed by the onboard apparatus 10' according to the second embodiment of the present invention. The process illustrated in FIG. 5 is performed by the onboard apparatus 10', for example, when the button edit screen 310 is displayed on the display 11.

First, the area size changing unit 107 determines whether the number of buttons to be displayed on the button edit screen 310 has been changed (step S502). If the area size changing unit 107 determines that the number of buttons to be displayed on the button edit screen 310 has not been changed (NO in step S502), the area size changing unit 107 makes the determination in step S502 again.

On the other hand, if the area size changing unit 107 determines that the number of buttons to be displayed on the button edit screen 310 has been changed (YES in step S502), the area size changing unit 107 changes the size of the text display area of each button displayed in the button edit screen 310 (step S504).

Next, the newline insertion unit 105' resets an already inserted newline character to a space in a text input to each text display area (step S506). The newline insertion unit 105' then determines whether a position of a newline character corresponding to a new size of the text display area is stored in the newline position storage unit 108 (step S508).

If the newline insertion unit 105' determines that a position of a newline character corresponding to the new size of each text display area is stored in the newline position storage unit 108 (YES in step S508), the newline insertion unit 105' newly inserts a newline character into the text, in which a newline character has been reset to a space in step S506, at the position of a newline character stored in the newline position storage unit 108 (step S510). The display control unit 106 then displays the text into which the newline character has been newly inserted in step S510 in each text display area (step S524), and the onboard apparatus 10' ends the process illustrated in FIG. 5.

On the other hand, if the newline insertion unit 105' determines that a position of a newline character corresponding to the new size of each text display area is not stored in the newline position storage unit 108 (NO in step S508), the text determination unit 102 determines whether the text, in which a newline character has been reset to a space in step S506, can be displayed within the width of each text display area (step S512).

If the text determination unit 102 determines that the text in which a newline character has been reset to a space in step S506 can be displayed within the width of each text display area (YES in step S512), the display control unit 106 displays the text in which a newline character has been reset to a space in step S506 in each text display area (step S524), and the onboard apparatus 10' ends the process illustrated in FIG. 5.

On the other hand, if the text determination unit 102 determines that the text in which a newline character has been reset to a space in step S506 cannot be displayed within the width of each text display area (NO in step S512), the space selection unit 103 selects a first space from an end of the text in which a newline character has been reset to a space in step S506 (step S514). The partial text determination unit 104 then determines whether a part of the text, in which a newline character has been reset to a space in step S506, before the selected space can be displayed within the width of each text display area (step S516).

If the partial text determination unit 104 determines that the part of the text, in which a newline character has been reset to a space in step S506, before the selected space cannot be displayed within the width of each text display area (NO in step S516), the space selection unit 103 selects a next space in the text in which a newline character has been reset to a space in step S506 (step S514), and the partial text determination unit 104 makes the determination in step S516 again.

On the other hand, if the partial text determination unit 104 determines that the part of the text, in which a newline character has been reset to a space in step S506, before the selected space can be displayed within the width of each text display area (YES in step S516), the newline insertion unit 105' newly inserts a newline character into the text, in which a newline character has been reset to a space in step S506, at the selected space (step S518).

The newline position storage unit 108 then associates the new size of each text display area and the position at which a newline character has been inserted in step S518 with each other and stores the size and the position (step S520).

Furthermore, the partial text determination unit 104 determines whether a new line of the text into which a newline character has been inserted in step S518 can be displayed within the width of each text display area (step S522). If the partial text determination unit 104 determines that the new line of the text into which a newline character has been inserted in step S518 cannot be displayed within the width of each text display area (NO in step S522), the onboard apparatus 10' performs the processing in step S514 and later again.

On the other hand, if the partial text determination unit 104 determines that the new line of the text into which a newline character has been inserted in step S518 can be displayed within the width of each text display area (YES in step S522), the display control unit 106 displays the text into which a newline character has been inserted in step S518 in each text display area (step S524), and the onboard apparatus 10' ends the process illustrated in FIG. 5.

Specific Example of Process for Controlling Text to Be Displayed

Figure 6A:
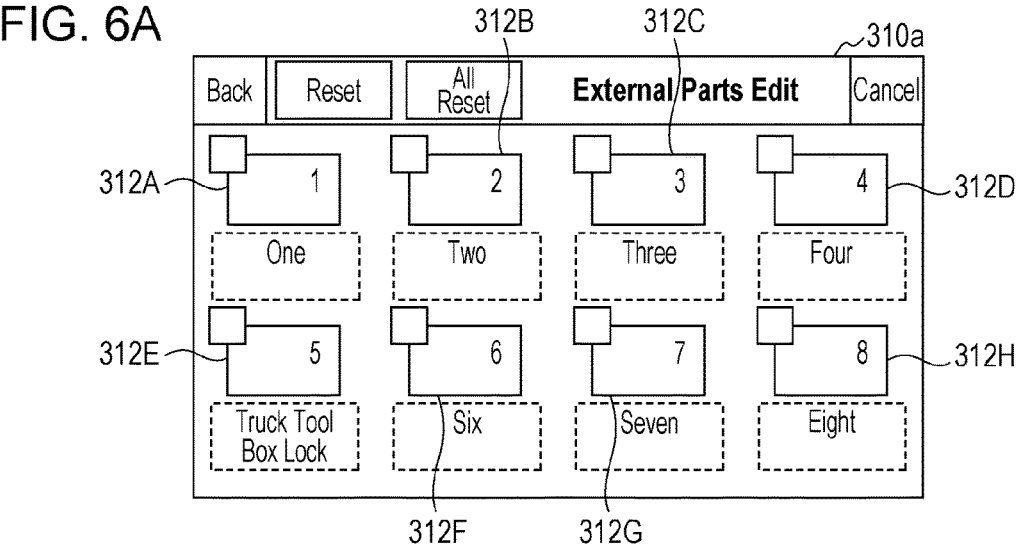
FIGS. 6A to 6C are diagrams illustrating a specific example of a process for controlling text to be displayed performed by the onboard apparatus according to the second embodiment of the present invention.
Figure 6B:
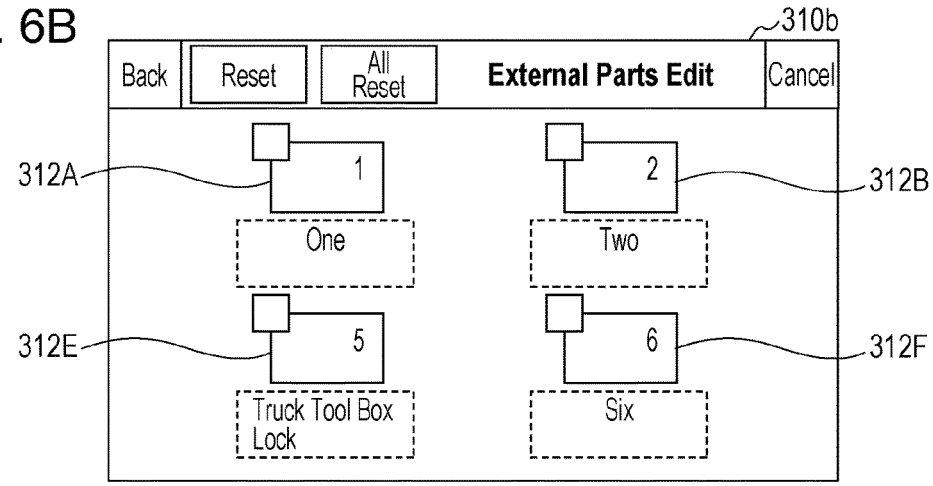
Figure 6C:
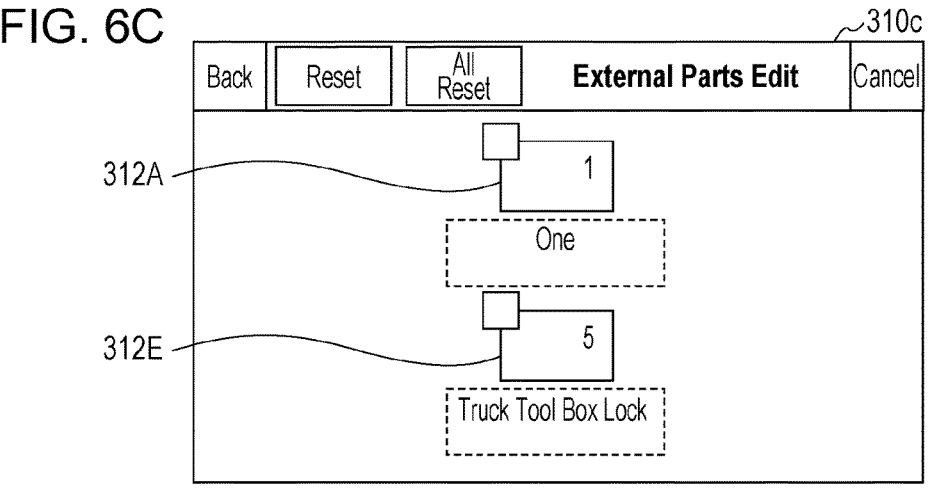

FIGS. 6A to 6C are diagrams illustrating a specific example of a process for controlling text to be displayed performed by the onboard apparatus 10' according to the second embodiment of the present invention. In a button edit screen 310a illustrated in FIG. 6A, the eight buttons 312A to 312H are displayed. In a button edit screen 310b illustrated in FIG. 6B, the four buttons 312A, 312B, 312E, and 312F are displayed. In a button edit screen 310c illustrated in FIG. 6C, the two buttons 312A and 312E are displayed.

In the button edit screen 310a illustrated in FIG. 6A, the text "Truck Tool Box Lock" is displayed in the text display area of the button 312E. Here, a newline character is inserted into the text "Truck Tool Box Lock" at the space between "Tool" and "Box". This is because the partial text determination unit 104 has determined that, in the text "Truck Tool Box Lock", the partial text "Truck Tool" can be displayed within the width of the text display area of the button 312E. In FIG. 6A, therefore, the text "Truck Tool Box Lock" is displayed in the text display area of the button 312E with a new line starting between "Tool" and "Box".

In the button edit screen 310b illustrated in FIG. 6B, the number of buttons displayed is changed from eight in the button edit screen 310a illustrated in FIG. 6A to four. In the button edit screen 310b, too, the text "Truck Tool Box Lock" is displayed in the text display area of the button 312E. In the button edit screen 310b, however, the newline character inserted into the text "Truck Tool Box Lock" between "Tool" and "Box" in FIG. 6A is reset to a space and a newline character is newly inserted into the space between "Box" and "Lock". This is because the size of the text display area of the button 312E is larger than in the button edit screen 310a illustrated in FIG. 6A and the partial text determination unit 104 has determined that, in the text "Truck Tool Box Lock", the partial text "Truck Tool Box" can be displayed within the width of the text display area of the button 312E. In FIG. 6B, therefore, the text "Truck Tool Box Lock" is displayed in the text display area of the button 312E with a new line starting between "Box" and "Lock".

In the button edit screen 310c illustrated in FIG. 6C, the number of buttons displayed is changed from four in the button edit screen 310b illustrated in FIG. 6B to two. In the button edit screen 310c, too, the text "Truck Tool Box Lock" is displayed in the text display area of the button 312E. In the button edit screen 310c, however, the newline character inserted into the text "Truck Tool Box Lock" between "Box" and "Lock" in FIG. 6B is reset to a space, but a newline character is not newly inserted. This is because the size of the text display area of the button 312E is larger than in the button edit screen 310b illustrated in FIG. 6B and the text determination unit 102 has determined that the entirety of the text "Truck Tool Box Lock" can be displayed within the width of the text display area of the button 312E. In FIG. 6C, therefore, the text "Truck Tool Box Lock" is displayed in the text display area of the button 312E without starting a new line.

Once the button edit screen 310a is displayed, the size of the text display area of the button 312E in the button edit screen 310a and the position of a newline character (between "Tool" and "Box") are associated with each other and stored in the newline position storage unit 108. As a result, if the text display area of the button 312E is displayed again with the same size as that of the text display area of the button 312E in the button edit screen 310a, the text "Truck Tool Box Lock" is displayed with a new line starting between "Tool" and "Box" on the basis of the information stored in the newline position storage unit 108.

Once the button edit screen 310b is displayed, the size of the text display area of the button 312E in the button edit screen 310b and the position of a newline character (between "Box" and "Lock") are associated with each other and stored in the newline position storage unit 108. As a result, if the text display area of the button 312E is displayed again with the same size as that of the text display area of the button 312E in the button edit screen 310b, the text "Truck Tool Box Lock" is displayed with a new line starting between "Box" and "Lock" on the basis of the information stored in the newline position storage unit 108.

Once the button edit screen 310c is displayed, the size of the text display area of the button 312E in the button edit screen 310c and the position of a newline character (none) are associated with each other and stored in the newline position storage unit 108. As a result, if the text display area of the button 312E is displayed again with the same size as that of the text display area of the button 312E in the button edit screen 310c, the text "Truck Tool Box Lock" is displayed without starting a new line on the basis of the information stored in the newline position storage unit 108.

As described above, according to the second embodiment of the present invention, even if the size of the text display area of each of the buttons 312A to 312H is changed, a position of a newline character in text input to the text display area is automatically changed to one of the spaces such that the text can be displayed within the width of the text display area, and the text is displayed in the text display area. According to the second embodiment of the present invention, therefore, even after the size of a text display area in the button edit screen 310 is changed, a text input from the text edit screen 300 can be displayed in the text display area in the button edit screen 310 in an easy-to-see manner without requiring the user to perform a troublesome operation.

In addition, according to the second embodiment of the present invention, since a position of a newline character inserted by the newline insertion unit 105' is stored in the newline position storage unit 108 each time the size of a text display area is changed, a process for obtaining a position of a newline character (a process performed by the text determination unit 102, the space selection unit 103, and the partial text determination unit 104) need not be newly performed when the size of the text display area has been changed to that stored in the newline position storage unit 108. As a result, a burden on the onboard apparatus 10' can be reduced.

Third Embodiment

Next, a third embodiment of the present invention will be described with reference to FIGS. 7 to 9C. In the third embodiment, an example will be described in which each time the size of text displayed in each text display area is changed, a position of a newline character in each text is changed in accordance with the new size of each text.

Example of Functional Configuration of Onboard Apparatus 10"

Figure 7:
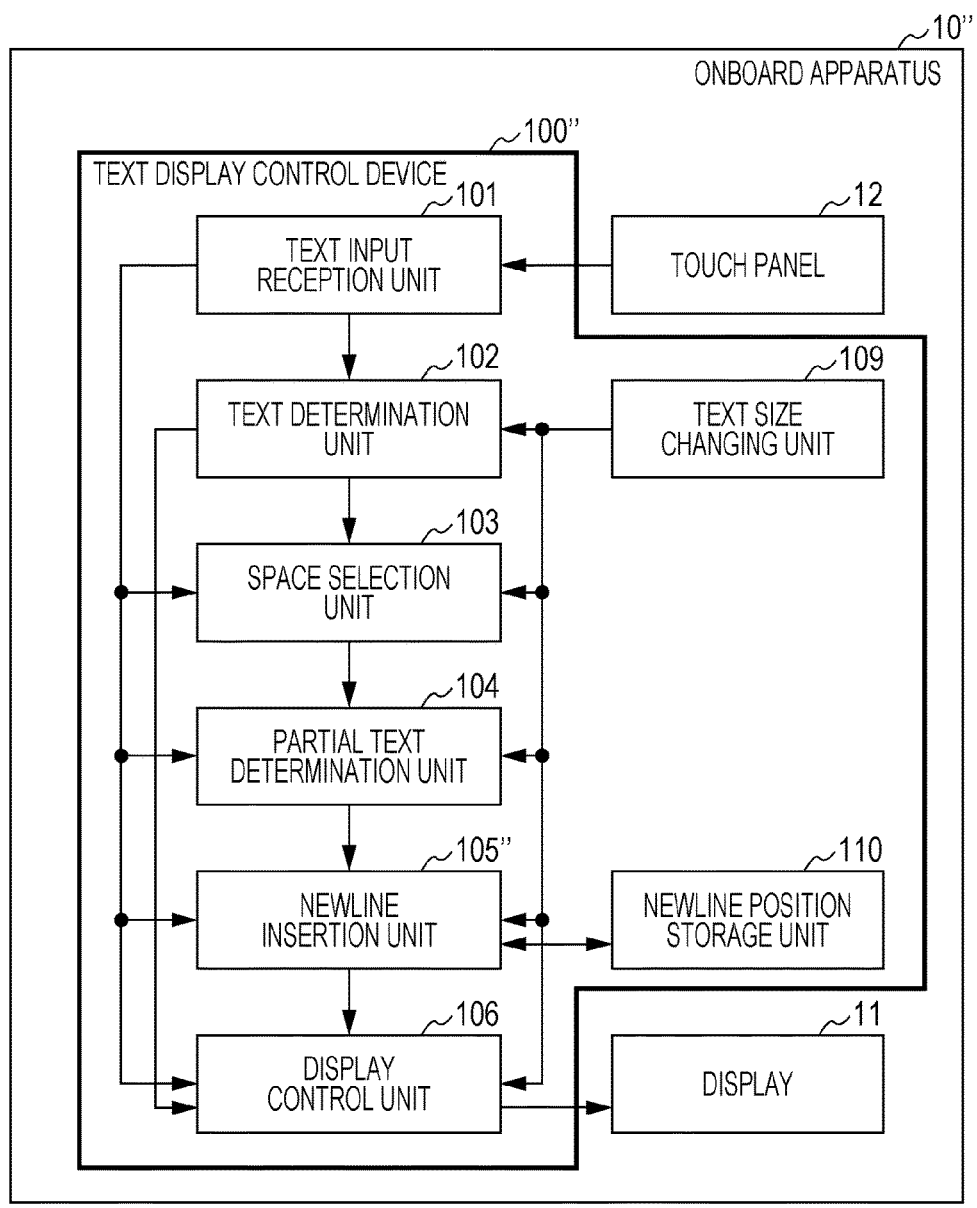
FIG. 7 is a block diagram illustrating an example of a functional configuration of an onboard apparatus according to a third embodiment of the present invention.

FIG. 7 is a block diagram illustrating an example of a functional configuration of an onboard apparatus 10" according to the third embodiment of the present invention. The onboard apparatus 10" illustrated in FIG. 7 is different from the onboard apparatus 10 according to the first embodiment illustrated in FIG. 1 in that a text display control device 100" further includes a text size changing unit 109 and a newline position storage unit 110 and replaces the newline insertion unit 105 with a newline insertion unit 105".

The text size changing unit 109 changes the size of text displayed in each text display area. If the user operates the touch panel 12 and issues an instruction to change the size of text in a text display area of each button, for example, the text size changing unit 109 changes the size of the text in the text display area of each button.

Each time the text size changing unit 109 changes the size of text displayed in each text display area, the newline insertion unit 105" changes a position of a newline character in the text displayed in each text display area.

Each time the text size changing unit 109 changes the size of text displayed in each text display area, the newline position storage unit 110 associates a new size of the text and a position of a newline character at a time when the text is displayed with the new size with each other and stores the size and the position.

If a position of a newline character corresponding to a new size of text is stored in the newline position storage unit 110, the newline insertion unit 105" resets an already inserted newline character to a space in the text input to a text display area and newly inserts a newline character at the position of a newline character stored in the newline position storage unit 110. The display control unit 106 then displays, with the new size, the text into which the newline insertion unit 105" has newly inserted a newline character in the text display area.

On the other hand, if a position of a newline character corresponding to a new size of text is not stored in the newline position storage unit 110, the newline insertion unit 105" resets an already inserted newline character to a space in the text input to a text display area and newly inserts a newline character at a position newly obtained by the space selection unit 103 and the partial text determination unit 104 (that is, a space with which a partial text can be displayed within the width of the text display area). The display control unit 106 then displays, with a new size, the text into which the newline insertion unit 105" has newly inserted a newline character in the text display area.

If text displayed in a text display area can be displayed within the width of the text display area in a line with the new size, the newline insertion unit 105" resets an already inserted newline character to a space but does not newly insert a newline character.

Example of Process Performed by Onboard Apparatus 10"

Figure 8:
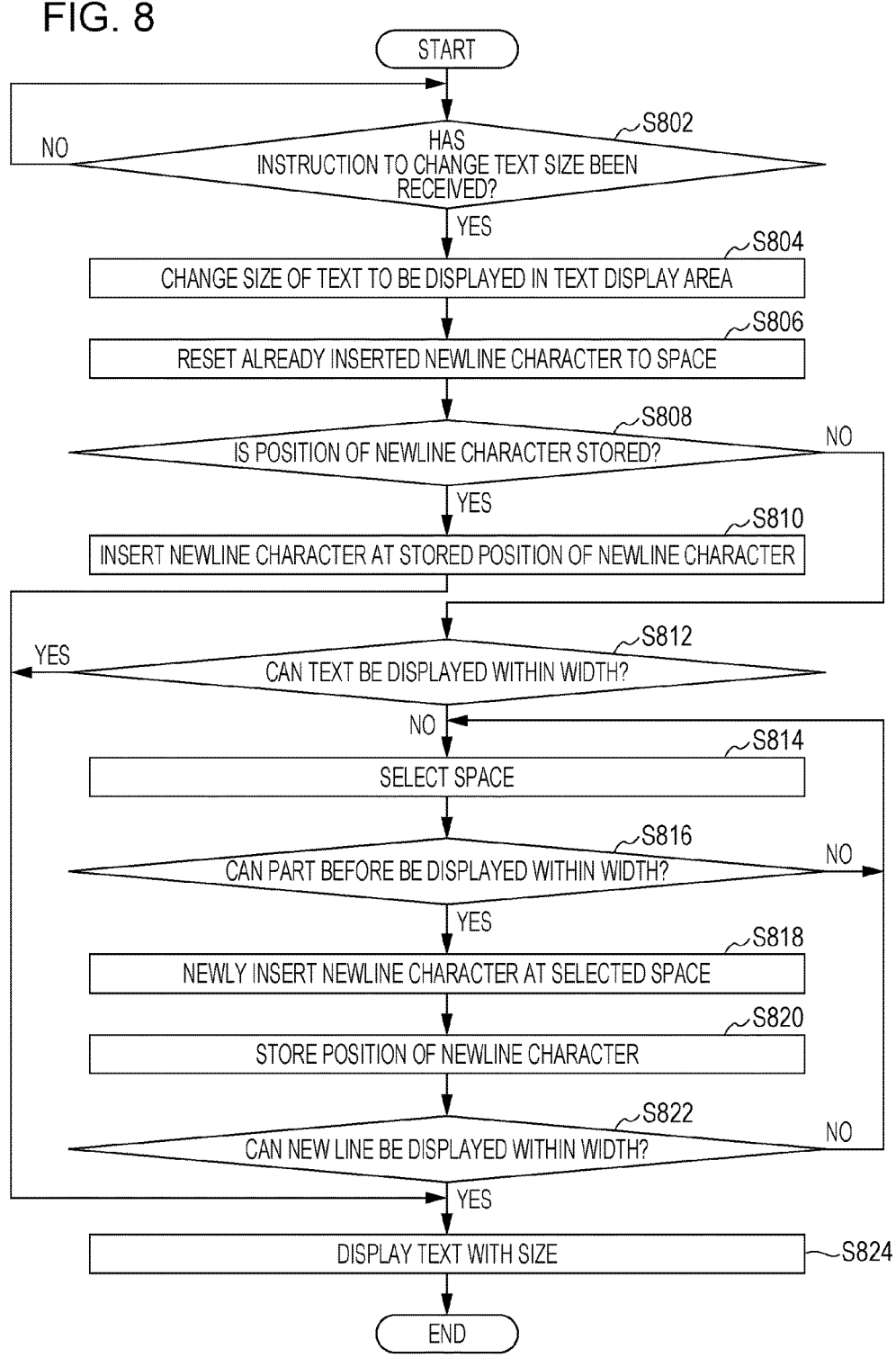
FIG. 8 is a flowchart illustrating an example of a process performed by the onboard apparatus according to the third embodiment of the present invention.

FIG. 8 is a flowchart illustrating an example of a process performed by the onboard apparatus 10" according to the third embodiment of the present invention. The process illustrated in FIG. 8 is performed by the onboard apparatus 10", for example, when the button edit screen 310 is displayed on the display 11.

First, the text size changing unit 109 determines whether an instruction to change the size of text displayed in each text display area in the button edit screen 310 has been received (step S802). If the text size changing unit 109 determines that an instruction to change the size of the text has not been received (NO in step S802), the text size changing unit 109 makes the determination in step S802 again.

On the other hand, if the text size changing unit 109 determines that an instruction to change the size of the text has been received (YES in S802), the text size changing unit 109 changes the size of the text displayed in each text display area in the button edit screen 310 (step S804).

Next, the newline insertion unit 105" resets an already inserted newline character in the text input to each text display area (step S806). The newline insertion unit 105" then determines whether a position of a newline character corresponding to a new size of the text is stored in the newline position storage unit 110 (step S808).

If the newline insertion unit 105" determines that a position of a newline character corresponding to the new size of the text is stored in the newline position storage unit 110 (YES in step S808), the newline insertion unit 105" newly inserts a newline character into the text in which a newline character has been reset to a space in step S806 at the position of a newline character stored in the newline position storage unit 110 (step S810). The display control unit 106 then displays, with the new size, the text into which a newline character has been newly inserted in step S810 in each text display area (step S824), and the onboard apparatus 10" ends the process illustrated in FIG. 8.

On the other hand, if the newline insertion unit 105" determines that a position of a newline character corresponding to the new size of the text is not stored in the newline position storage unit 110 (NO in step S808), the text determination unit 102 determines whether the text in which a newline character has been reset to a space in step S806 can be displayed within the width of each text display area with the new size (step S812).

If the text determination unit 102 determines that the text in which a newline character has been reset to a space in step S806 can be displayed within the width of each text display area (YES in step S812), the display control unit 106 displays, with the new size, the text in which a newline character has been reset to a space in step S806 in each text display area (step S824), and the onboard apparatus 10" ends the process illustrated in FIG. 8.

On the other hand, if the text determination unit 102 determines that the text in which a newline character has been reset to a space in step S806 cannot be displayed within the width of each text display area with the new size (NO in step S812), the space selection unit 103 selects a first space from an end of the text in which a newline character has been reset to a space in step S806 (step S814). The partial text determination unit 104 then determines whether a part of the text, in which a newline character has been reset to a space in step S806, before the selected space can be displayed within the width of each text display area with the new size (step S816).

If the partial text determination unit 104 determines that the part of the text, in which a newline character has been reset to a space in step S806, before the selected space cannot be displayed within the width of each text display area (NO in step S816), the space selection unit 103 selects a next space in the text in which a newline character has been reset to a space in step S806 (step S814), and the partial text determination unit 104 makes the determination in step S816 again.

On the other hand, if the partial text determination unit 104 determines that the part of the text in which a newline character has been reset to a space in step S806 can be displayed within the width of each text display area with the new size (YES in step S816), the newline insertion unit 105" newly inserts a newline character into the text, in which a newline character has been reset to a space in step S806, at the selected space (step S818).

The newline position storage unit 110 then associates the new size of the text and the position at which a newline character has been newly inserted in step S818 with each other and stores the new size and the position (step S820).

Furthermore, the partial text determination unit 104 determines whether a new line of the text into which a newline character has been newly inserted in step S818 can be displayed within the width of each text display area with the new size (step S822). If the partial text determination unit 104 determines that the new line of the text into which a newline character has been newly inserted in step S818 cannot be displayed within the width of the each text display area with the new size (NO in step S822), the onboard apparatus 10" performs the processing in step S814 and later again.

On the other hand, if the partial text determination unit 104 determines that the new line of the text into which a newline character has been newly inserted in step S818 can be displayed within the width of the each text display area with the new size (YES in step S822), the display control unit 106 displays, with the new size, the text into which a newline character has been newly inserted in step S818 in each text display area (step S824), and the onboard apparatus 10" ends the process illustrated in FIG. 8.

Specific Example of Process for Controlling Text to Be Displayed

Figure 9A:
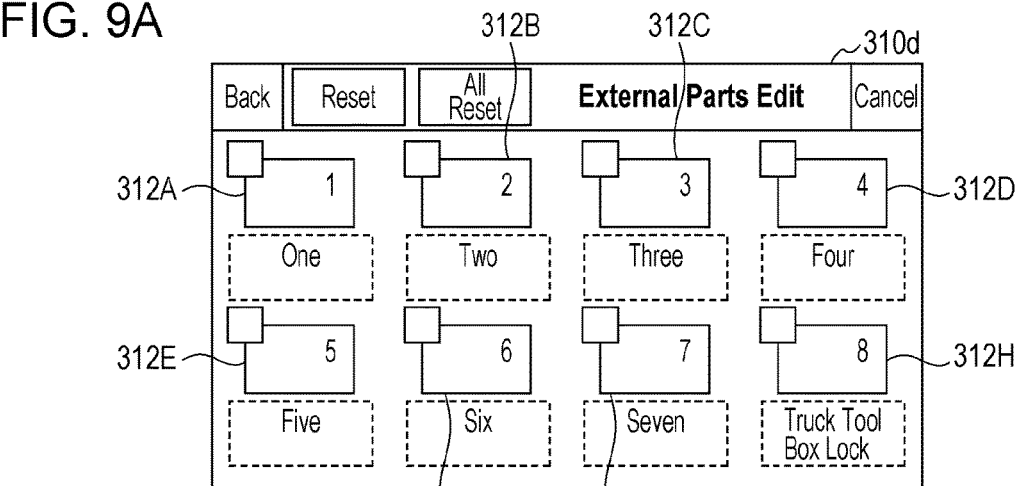
FIGS. 9A to 9C are diagrams illustrating a specific example of a process for controlling text to be displayed performed by the onboard apparatus according to the third embodiment of the present invention.
Figure 9B:
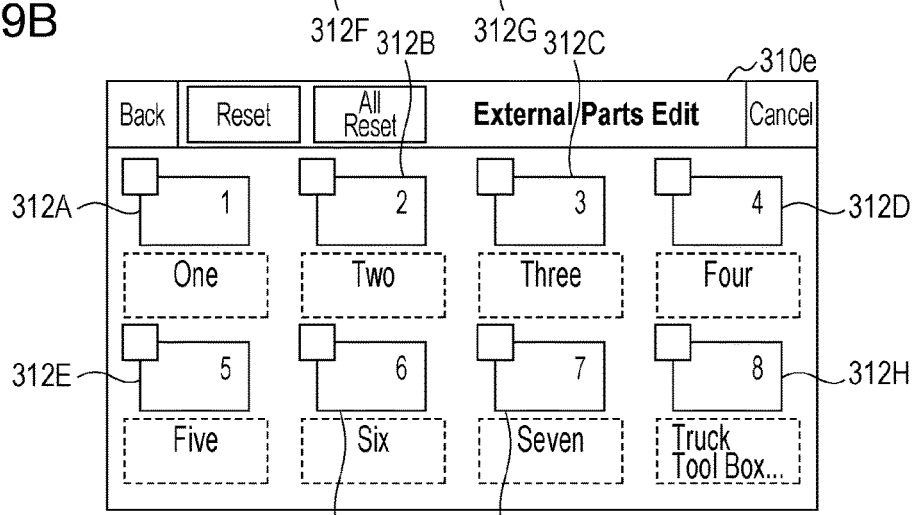
Figure 9C:
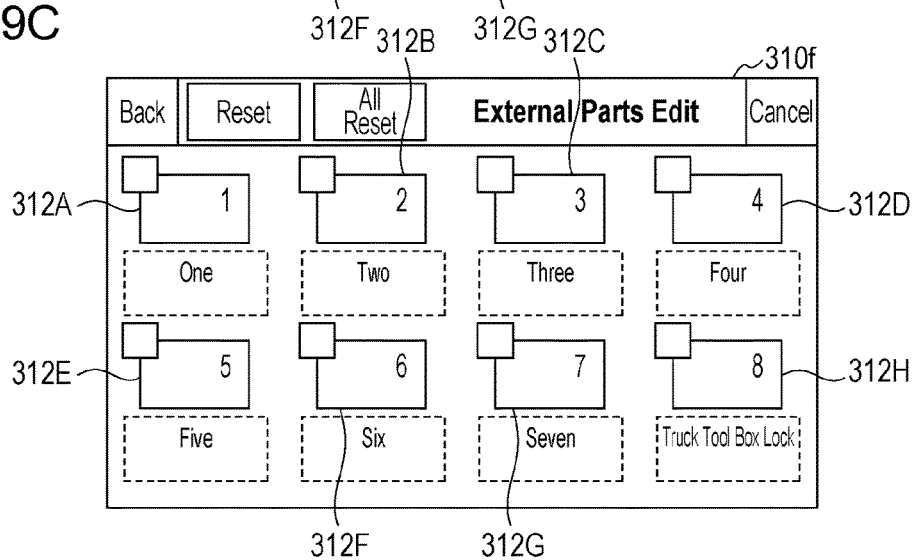
Figure 10A:
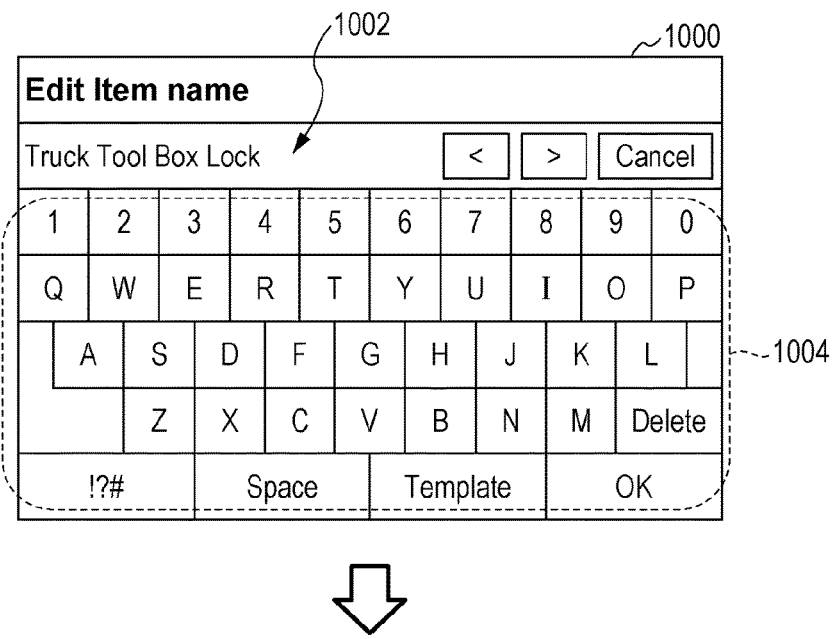
FIGS. 10A and 10B are diagrams illustrating an example of text displayed on an onboard apparatus according to an example of the related art.
Figure 10B:
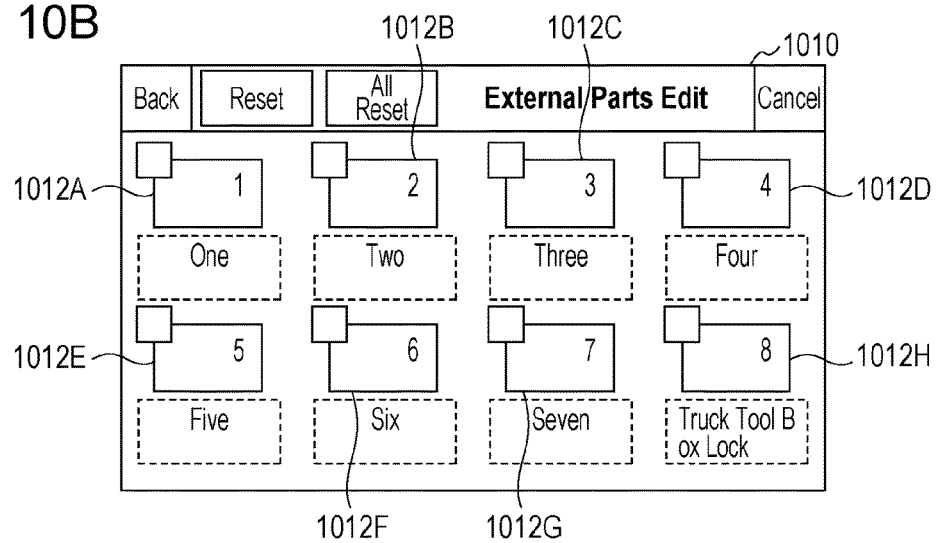

FIGS. 9A to 9C are diagrams illustrating a specific example of a process for controlling a text to be displayed performed by the onboard apparatus 10" according to the third embodiment of the present invention. In a button edit screen 310*d* illustrated in FIG. 9A, texts are displayed in the text display areas of the eight buttons 312A to 312H with a first size. In a button edit screen 310*e* illustrated in FIG. 9B, the texts are displayed in the text display areas of the eight buttons 312A to 312H with a second size (second size>first size). In a button edit screen 310*f* illustrated in FIG. 9C, the texts are displayed in the text display areas of the eight buttons 312A to 312H with a third size (third size<first size).

In the button edit screen 310*d* illustrated in FIG. 9A, the text "Truck Tool Box Lock" is displayed in the text display area of the button 312H. In the text "Truck Tool Box Lock", a newline character is inserted into the space between "Tool" and "Box". This is because the partial text determination unit 104 determines that the partial text "Truck Tool" can be displayed within the width of the text display area of the button 312H if the text "Truck Tool Box Lock" is displayed in the text display area of the button 312H with the first size. In FIG. 9A, therefore, the text "Truck Tool Box Lock" is displayed in the text display area of the button 312H with a new line starting between "Tool" and "Box".

In the button edit screen 310e illustrated in FIG. 9B, the size of the text in the text display area of each of the eight buttons 312A to 312H is changed to the second size, which is larger than the first size. In the button edit screen 310e, too, the text "Truck Tool Box Lock" is displayed in the text display area of the button 312H. In the button edit screen 310e, however, the newline character inserted into the text "Truck Tool Box Lock" between "Tool" and "Box" in FIG. 9A has been reset to a space, and a newline character has been newly inserted into the space between "Truck" and "Tool". This is because the maximum number of letters that can be displayed within the width of the text display area of the button 312H is smaller than in the button edit screen 310d illustrated in FIG. 9A and the partial text determination unit 104 has determined that, in the text "Truck Tool Box Lock", a partial text "Truck" can be displayed within the width of the text display area of the button 312H. In FIG. 9B, therefore, the text "Truck Tool Box Lock" is displayed in the text display area of the button 312H with a new line starting between "Truck" and "Tool".

In this example, the maximum number of lines that can be displayed in the text display area of the button 312H is limited to two. A part of the text "Truck Tool Box Lock" that cannot be displayed within two lines (a part after "Truck Tool Box"), therefore, is omitted as ". . . ".

In the button edit screen 310f illustrated in FIG. 9C, the size of the text display area of each of the eight buttons 312A to 312H is changed to the third size, which is smaller than the first size. In the button edit screen 310f, too, the text "Truck Tool Box Lock" is displayed in the text display area of the button 312H. In the button edit screen 310f, however, although the newline character inserted into the text "Truck Tool Box Lock" between "Tool" and "Box" in FIG. 9A has been reset to a space, a newline character has not been newly inserted. This is because the number of letters that can be displayed within the width of the text display area of the button 312H is larger than in the button edit screen 310d illustrated in FIG. 9A and the text determination unit 102 has determined that the entirety of the text "Truck Tool Box Lock" can be displayed within the width of the text display area of the button 312H. In FIG. 9C, therefore, the text "Truck Tool Box Lock" is displayed in the text display area of the button 312H without starting a new line.

Once the button edit screen 310d is displayed, the size (first size) of the text displayed in the text display area of the button 312H and the position of a newline character (between "Tool" and "Box") are associated with each other and stored in the newline position storage unit 110. As a result, if the size of the text in the text display area of the button 312H is changed to the first size again, the text "Truck Tool Box Lock" is displayed with a new line starting between "Tool" and "Box" on the basis of the information stored in the newline position storage unit 110.

Once the button edit screen 310e is displayed, the size (second size) of the text displayed in the text display area of the button 312H and the position of a newline character (between "Truck" and "Tool") are associated with each other and stored. As a result, if the size of the text in the text display area of the button 312H is changed to the second size again, the text "Truck Tool Box Lock" is displayed with a new starting between "Truck" and "Tool" on the basis of the information stored in the newline position storage unit 110.

Once the button edit screen 310f is displayed, the size (third size) of the text displayed in the text display area of the button 312H and the position of a newline character (none) are associated with each other and stored in the newline position storage unit 110. As a result, if the size of the text in the text display area of the button 312H is changed to the third size again, the text "Truck Tool Box Lock" is displayed without starting a newline on the basis of the information stored in the newline position storage unit 110.

As described above, according to the third embodiment of the present invention, even if the size of the text displayed in the text display area of each of the buttons 312A to 312H is changed, a position of a newline character in the text input to the text display area is automatically changed to one of the spaces such that the text can be displayed with a new size within the width of the text display area, and the text is displayed in the text display area with the new size. According to the third embodiment of the present invention, therefore, even after the size of text in a text display area in the button edit screen 310 is changed, the text input from the text edit screen 300 can be displayed in the text display area in the button edit screen 310 in an easy-to-see manner without requiring the user to perform a troublesome operation.

In addition, according to the third embodiment of the present invention, since a position of a newline character inserted by the newline insertion unit 105" is stored in the newline position storage unit 110 each time the size of a text displayed in a text display area is changed, the process for obtaining a position of a newline character (the process performed by the text determination unit 102, the space selection unit 103, and the partial text determination unit 104) need not be newly performed when the size of the text in the text display area has been changed to that stored in the newline position storage unit 110. As a result, a burden on the onboard apparatus 10" can be reduced.

Although a text display area accompanying a button is taken in the above embodiments as an example of a text display area described in the claims, the present invention is not limited to this. In addition, although the size of the text display area of each button is changed in accordance with a change in the number of buttons displayed in the button edit screen 310 in the above embodiments, the present invention is not limited to this. The user may operate the touch panel 12, for example, to change the size of the text display area arbitrarily, instead.

Although the text edit screen 300 replaces the button edit screen 310 on the display 11 when the user inputs text in the above embodiments, the present invention is not limited to this. The text edit screen 300 may overlap the button edit screen 310 on the display 11, for example, when the user inputs text.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A text display control apparatus that controls how text input from a text edit screen is displayed in a text display area in a display screen, the text display area having a width within which the text may be displayed in the display screen, the text including words and one or more spaces separating respective words of the text, the text having a beginning and an end, the text display control apparatus comprising:
   a text determination unit that determines whether the text input from the text edit screen is short enough to be displayed within the width of the text display area;
   a space selection unit that, if the text determination unit determines that the text is not short enough to be displayed within the width of the text display area, sequentially selects, one space at a time, spaces of the one or more spaces from the end of the text to the beginning of the text;
   a partial text determination unit that, each time the space selection unit selects a space, determines whether a part of the text between the space and the beginning of the text is short enough to be displayed within the width of the text display area;
   a newline insertion unit that, if the partial text determination unit determines that the part of the text between the space and the beginning of the text is short enough to be displayed within the width of the text display area, replaces the space with a newline character in the text in order to start a new line in the text displayed in the text display area at an appropriate position between words of the text; and
   a display control unit that displays, in the text display area, the text determined by the text determination unit to be short enough to be displayed within the width of the text display area or the text into which the newline insertion unit has replaced the space with the newline character.

2. The text display control apparatus according to claim 1, wherein, when the text is input to the text display area in the display screen, the display control unit switches a screen displayed on a display from the display screen to the text edit screen.

3. The text display control apparatus according to claim 1, further comprising:
   an area size changing unit that changes a size of the text display area,
   wherein, each time the area size changing unit changes the size of the text display area, the newline insertion unit deletes a previously inserted newline character from the text displayed in the text display area, and
   wherein the processes performed by the text determination unit, the space selection unit, the partial text determination unit, the newline insertion unit, and the display control unit are performed again on the text from which the newline insertion unit has deleted the newline character.

4. The text display control apparatus according to claim 3, further comprising:
   a newline position storage unit that, each time the area size changing unit changes the size of the text display area, associates a new size of the text display area and a position at which the newline insertion unit has inserted a newline character into the text displayed in the text display area with each other and stores the new size and position,
   wherein, if the area size changing unit changes the size of the text display area and a position of a newline character corresponding to a new size of the text display area is stored in the newline position storage unit, the newline insertion unit inserts a newline character into the text displayed in the text display area at the position of a newline character corresponding to the new size of the text display area stored in the newline position storage unit.

5. The text display control apparatus according to claim 1, further comprising:
   a text size changing unit that changes a size of the text,
   wherein, each time the text size changing unit changes the size of the text, the newline insertion unit deletes a previously inserted newline character from the text displayed in the text display area, and
   wherein processes performed by the text determination unit, the space selection unit, the partial text determination unit, the newline insertion unit, and the display control unit are performed again on the text from which the newline insertion unit has deleted the newline character.

6. The text display control apparatus according to claim 5, further comprising:
   a newline position storage unit that, each time the text size changing unit changes the size of the text, associates a new size of the text and a position at which the newline insertion unit has inserted a newline character into the text displayed in the text display area with the new size with each other and store the new size and position,
   wherein, if the text size changing unit changes the size of the text and a position of a newline character corresponding to a new size of the text is stored in the newline position storage unit, the newline insertion unit inserts a newline character into the text displayed in the text display area with the new size at the position of a newline character corresponding to the new size of the text stored in the newline position storage unit.

7. The text display control apparatus according to claim 1, wherein the display control unit displays, in the text display area, the text into which the newline insertion unit has inserted the newline character while left-justifying, center-justifying, or right-justifying the text.

8. A method for controlling a text to be displayed used by a text display control apparatus that controls how a text input from a text edit screen is displayed in a text display area in a display screen, the text display area having a width within which the text may be displayed in the display screen, the text including words and one or more spaces separating respective words of the text, the text having a beginning and an end, the method comprising the steps of:
   determining, using a text determination unit of the text display control apparatus, whether the text input from the text edit screen is short enough to be displayed within a the width of the text display area;
   sequentially selecting, using a space selection unit of the text display control apparatus, one space at a time, spaces of the one or more spaces from the end of the text to the beginning of the text if it is determined in the step of determining that the text is not short enough to be displayed within the width of the text display area;
   determining, using a partial text determination unit of the text display control apparatus, whether, each time a space is selected in the step of sequentially selecting, a part of the text between the space and the beginning of the text is short enough to be displayed within the width of the text display area;

replacing, using a newline insertion unit of the text display control apparatus, the space with a newline character in the text in order to start a new line in the text displayed in the text display area at an appropriate position between words of the text, if it is determined in the second step of determining that the part of the text between the space and the beginning of the text is short enough to be displayed within the width of the text display area; and displaying, in the text display area using a display control unit of the text display control apparatus, the text determined in the first step of determining to be short enough to be displayed within the width of the text display area or the text into which the newline character has replaced the space in the step of replacing.

9. The text display control method according to claim 8, wherein, when the text is input to the text display area in the display screen, the display control unit switches a screen displayed on a display from the display screen to the text edit screen.

10. The text display control method according to claim 8, further comprising:

changing, using an area size changing unit, a size of the text display area, wherein, each time the area size changing unit changes the size of the text display area, the newline insertion unit deletes a previously inserted newline character from the text displayed in the text display area, and wherein the processes performed by the text determination unit, the space selection unit, the partial text determination unit, the newline insertion unit, and the display control unit are performed again on the text from which the newline insertion unit has deleted the newline character.

11. The text display control method according to claim 10, further comprising:

each time the area size changing unit changes the size of the text display area, associating, using a newline position storage unit, a new size of the text display area and a position at which the newline insertion unit has inserted a newline character into the text displayed in the text display area with each other and storing the new size and position, wherein, if the area size changing unit changes the size of the text display area and a position of a newline character corresponding to a new size of the text display area is stored in the newline position storage unit, the newline insertion unit inserts a newline character into the text displayed in the text display area at the position of a newline character corresponding to the new size of the text display area stored in the newline position storage unit.

12. The text display control method according to claim 8, further comprising:

changing, using a text size changing unit, a size of the text, wherein, each time the text size changing unit changes the size of the text, the newline insertion unit deletes a previously inserted newline character from the text displayed in the text display area, and wherein processes performed by the text determination unit, the space selection unit, the partial text determination unit, the newline insertion unit, and the display control unit are performed again on the text from which the newline insertion unit has deleted the newline character.

13. The text display control method according to claim 12, further comprising:

each time the text size changing unit changes the size of the text, associating, using a newline position storage unit, a new size of the text and a position at which the newline insertion unit has inserted a newline character into the text displayed in the text display area with the new size with each other and storing the new size and position, wherein, if the text size changing unit changes the size of the text and a position of a newline character corresponding to a new size of the text is stored in the newline position storage unit, the newline insertion unit inserts a newline character into the text displayed in the text display area with the new size at the position of a newline character corresponding to the new size of the text stored in the newline position storage unit.

14. The text display control method according to claim 8, wherein the display control unit displays, in the text display area, the text into which the newline insertion unit has inserted the newline character while left-justifying, center-justifying, or right-justifying the text.

\* \* \* \* \*